July 1, 1958 H. J. VOELKEL ET AL 2,841,199
TRACTION INCREASING ASSEMBLY FOR VEHICLE TIRES
Filed Aug. 28, 1956 2 Sheets-Sheet 1
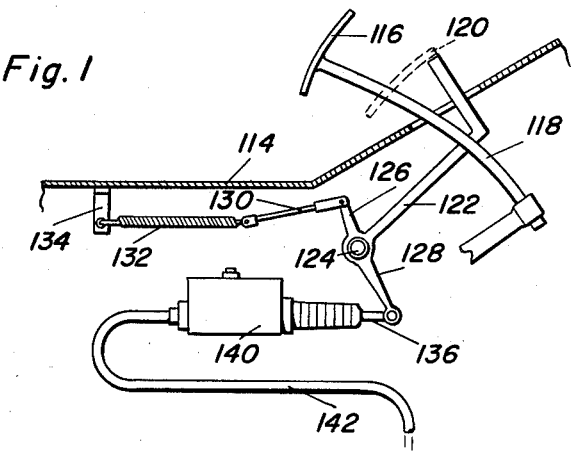
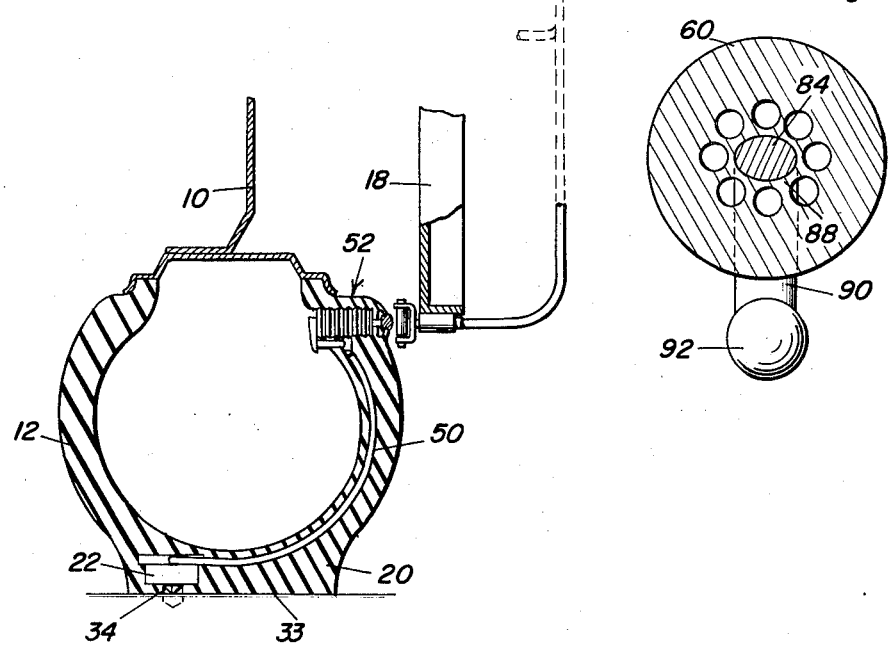
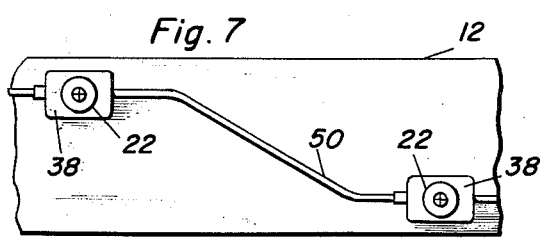
Hans J. Voelkel
Rudolf Ehrmann
INVENTORS,
BY Samuel Meerkreebs
ATTORNEY July 1, 1958        H. J. VOELKEL ET AL        2,841,199
TRACTION INCREASING ASSEMBLY FOR VEHICLE TIRES
Filed Aug. 28, 1956        2 Sheets-Sheet 2
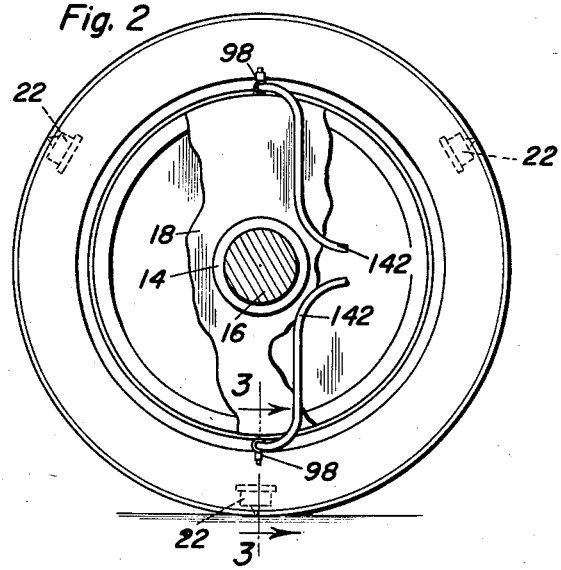
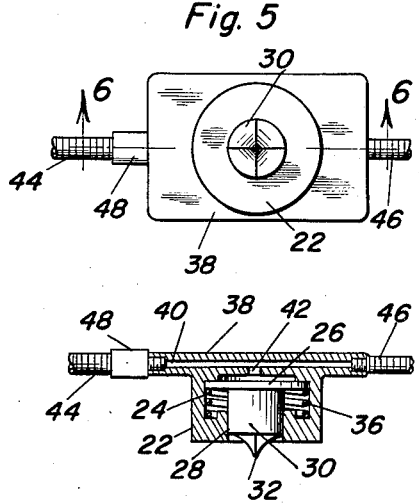
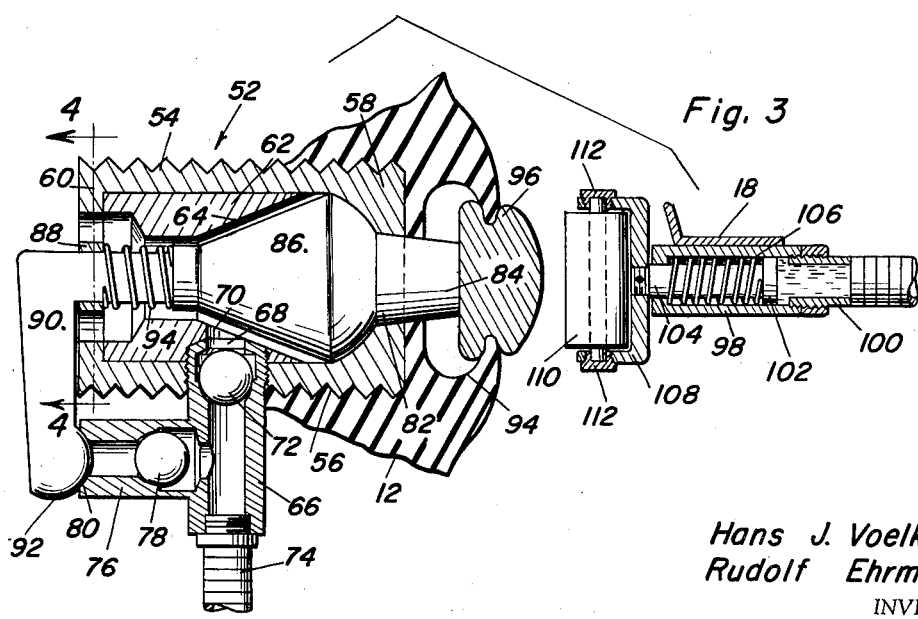
Hans J. Voelkel
Rudolf Ehrmann
            INVENTORS,
BY  Samuel Meerkreebs
            ATTORNEY United States Patent Office 2,841,199
Patented July 1, 1958

2,841,199

TRACTION INCREASING ASSEMBLY FOR VEHICLE TIRES

Hans J. Voelkel and Rudolf Ehrmann, Toronto, Ontario, Canada

Application August 28, 1956, Serial No. 606,737

8 Claims. (Cl. 152—208)

This invention relates in general to new and useful improvements in vehicle tires, and more specifically to an improved vehicle tire having mounted therein a traction increasing assembly.

The average vehicle tire is designed with a tread for obtaining a maximum friction contact with a road surface. However, when the tire encounters mud or snow conditions, the tread in many instances does not have sufficient traction or frictional grip to permit the self-propelling of the vehicle. As a result, in many instances the motorist finds it necessary to use chains or other traction increasing implements. This is undesirable because once the need for the chains is over, the operator of the vehicle must then remove the chains so as to prevent excessive wear on the chains.

It is therefore the primary object of this invention to provide a traction increasing assembly which may be mounted in vehicle tires and which normally has an inoperative position so that the tires may have the tread thereof function as normal, and to be selectively projectable to roadway engaging positions whereby the frictional gripping of the roadway surface by the tires is greatly increased.

Another object of this invention is to provide an improved vehicle tire having mounted thereon a traction increasing assembly, the traction increasing assembly being actuated by the air supply of a tire and being provided with suitable valve means which will permit the flow of air into and out of the tire and into the and out of the traction increasing assembly without any loss of air whatsoever.

A further object of this invention is to provide an improved vehicle tire having incorporated therein a traction increasing assembly of the mechanical type, the traction increasing assembly including a plurality of cylinders having pistons carrying road surface penetrating elements, the cylinders being connected to the interior of the tire for using the air pressure thereof by means of a valve there being provided suitable means for controlling the operation of the valve.

A still further object of this invention is to provide an improved vehicle tire having mounted therein traction increasing means, the traction increasing means being selectively operable from a removed point so as to be either inoperative or operative as desired, the removed point being preferably adjacent the operator's seat of the vehicle so that the operator may control the use of the traction increasing assembly while driving the vehicle.

These together with other objects and adavntages which will subsequently become apparent reside in the details of construction and operation as more fully hereinafter described and claimed, reference being had to the accompanying drawing forming a part hereof, wherein like numerals refer to like parts throughout, and in which:

Figure 1 is an enlarged transverse sectional view taken through a tire incorporating the traction increasing assembly, there also being shown diagrammatically a control means for the traction increasing assembly;

Figure 2 is a sectional view taken through an axle of a vehicle and showing the manner in which the control means for the traction increasing assembly is mounted on a backing plate of the vehicle wheel, a portion of the backing plate being broken away and shown in section in order to clearly illustrate the details of a valve operating ring member, the view being on a reduced scale;

Figure 3 is an enlarged fragmentary sectional view taken substantially upon the plane indicated by the section line 3—3 of Figure 2, the view being on an enlarged scale and showing the specific details of a valve for controlling the entrance and exit of air into the traction increasing assembly and the means for controlling the operation of the valve member;

Figure 4 is an enlarged sectional view taken substantially upon the plane indicated by the section line 4—4 of Figure 3 and shows further the details of the valve;

Figure 5 is a bottom view of one of the cylinders on an enlarged scale and removed from the tire;

Figure 6 is a longitudinal sectional view taken substantially upon the plane indicated by the section line 6—6 of Figure 5 and shows the specific details of one of the cylinders, the piston mounted therein and the roadway penetrating member carried by the piston; and Figure 7 is a fragmentary view of the tire tread and shows the arrangement of the cylinders mounted therein, the view being of a diagrammatic nature.

Referring now to the drawings in deail, it will be seen that there is illustrated in Figures 1 and 2 a vehicle wheel assembly which includes a wheel 10 having mounted thereon a tubeless tire 12. Wheel 10 is carried by a brake drum (not shown) mounted on an axle 16 for rotation therewith. The axle 16 is mounted in an axle housing 14 which has connected a backing plate 18 to the brake shoes of the vehicle wheel. These elements need not be changed with the exception of said features of tire 12 and the enlargement of the backing plate 18 for the purpose of mounting and protecting certain of the parts of the present invention.

Mounted within the tread area 20 of the tire 12 are a plurality of cylinders 22. The cylinders 22 are imbedded entirely within the tread area 20 and are disposed in circumferentially spaced, transversely alternating relation, as is best illustrated in Figure 7.

Referring now to Figures 5 and 6, it will be seen that each of the cylinders 22 includes a main bore 24 in which there is mounted for reciprocation a piston 26. Each cylinder 22 includes a secondary bore 28 which is communicated with the main bore 24 and which opens through the bottom of the cylinder 22. Slidably mounted in the secondary bore 28 is a roadway penetrating member 30 having a sharpened end 32. The member 30 is secured to the piston 26 for actuation thereby.

The tire 12 includes a tread 33 which has opening therethrough a bore 34, there being one bore 34 for each of the cylinders 22, the bore 34 being aligned with the member 30 and being adapted to receive the member 30. The piston 26 and the member 30 are disposed in retracted positions, as is best illustrated in Figure 6, by means of a spring 36.

Each cylinder 22 also includes a mounting plate 38 for securement within the tread area 20. A mounting plate 38 is provided with a longitudinal air passage 40 therethrough which is communicated with the bore 24 of the cylinder 22 by means of a communicating passage 42. The mounting plate 38 is provided at one end with an inlet fitting 44 and at the opposite end with an outlet fitting 46. The inlet fitting 44 includes a check valve 48.

Formed integrally within the casing of the tire 12 is a continuous air passage 50 which communicates together the cylinders 22. The fittings 44 and 46 are engaged in the air passage 50 to communicate the bores 24 of the cylinders 22 with the air passage 50.

In order that air may be selectively supplied to or released from the air passage 50, a valve indicated generally at 52 is carried by the inner side wall of the tire 12. Referring now to Figure 3 in particular, it will be seen that the valve 52 includes a generally cylindrical valve housing 54 which has a serrated or threaded exterior surface 56 which is interlocked with the side wall of the tire 12. The outer end of the valve housing 54 is closed by an end wall 58. The inner end of the valve housing 54 is provided with an end wall 60.

Positioned within the valve housing 54 is a valve seat forming member 62 having a valve seat surface 64.

Carried by the valve housing 54 is an exhaust fitting 66. The exhaust fitting 66 has an outlet opening 68 which is aligned with an opening 70 in the valve seat forming member 62 for communicating the exhaust fitting 66 with the interior of the valve housing 54. The exhaust fitting 66 is provided with an exhaust-only ball-check valve 72 adjacent its outlet opening 68. The opposite end of the exhaust fitting 66 is provided with a connector 74 for connecting the same with the air passage 50.

Preferably formed integral with the exhaust fitting 66 is an inlet fitting 76, the inlet fitting 76 being communicated with the exhaust fitting 66. The inlet fitting 76 is provided with an inlet-only ball-check valve 78 adjacent its connection with the exhaust fitting 66. The entrance of the inlet fitting 76 is also provided with a valve seat 80.

Slidably mounted with the valve housing 54 is a valve member which is referred to in general by the reference numeral 82. The valve member 82 includes a longitudinal shank portion 84 on which there is mounted an enlarged first valve member 86 which is selectively engaged with the valve seat surface 64 to close the exhaust fitting 66 against communication with the interior of the tire 12. The shank 84 extends through a guide 88 in the end wall 60 and terminates in a depending arm 90 carrying a second valve portion 92 which is engaged with the valve seat 80 for closing the inlet fitting 76. A spring 94 normally bears against the guide 88 and urges the valve member 82 to the position illustrated in Figure 3. When the valve member 82 is in this position, the exhaust fitting 66 is communicated with the interior of the tire 12 while the inlet fitting 76 is closed relative thereto.

The side wall of the tire 12 is provided with an enlarged annular recess 94 in which there is seated a ring member 96, the ring member 96 projecting inwardly from the inner side wall of the tire 12. When the ring member 96 is engaged and moved to the left, as viewed in Figure 3, the valve member 82 will be shifted so as to open the inlet fitting 76 and to close the exhaust fitting 66. This will communicate the air passage 50 with the interior of the tire 12 so as to supply compressed air to the cylinder 22. The cylinders 22 will then have projected therefrom the roadway penetrating member 30 which will project beyond the tread 33 of the tire 12 to increase the traction of the tire 12.

In order that the ring member 96 may be moved to an operative position, there is secured to the backing plate 18 at upper and lower points cylinders 98 which have connected thereto hydraulic lines 100. The cylinders 98 have mounted therein pistons 102 which have connected thereto plungers 104. The pistons 102 are spring urged to inoperative positions by springs 106 mounted on the plungers 104.

Carried by each of the plungers 104 in alignment with the ring member 96 is a yoke member 108 which carries a roller 110. The roller 110 is suitably journaled in bearing members 112 adjustably carried by the yoke 108. When the pistons 102 are moved to the left, as viewed in Figure 3, the rollers 110 are moved into engagement with the ring member 96 and urge the ring member 96 to the left thus operating the valve 52.

Referring now to Figure 1 in particular, it will be seen that there is illustrated a floor board 114 of a vehicle which the wheel described above is a part therein. Suitably mounted in the floor board 114 is a brake pedal 116 carried by a brake pedal support rod 118. Disposed adjacent the brake pedal 116 is a pedal 120 carried by a support rod 122 which is suitably journaled on a shaft 124. Connected to the support rod 122 is a crank including an arm 126 and an arm 128. The arm 126 has connected thereto a link 130 which is in turn connected to a spring 132 secured to an anchor 134. The arm 128 is connected to a link 136 which is in turn connected to a suitable hydraulic pump 140 which may be in the form of a hydraulic brake system master cylinder. Extending from the pump 140 are hydraulic lines 142 which are connected to the cylinders 98. Thus when the pedal 120 is depressed, the pump 140 will pump oil to the hydraulic lines 142 so as to actuate the piston 102. Spring 132 will return the control mechanism for the pump 142 to its normally inoperative position.

It is to be understood that during the normal operation of the tire 12, the roadway penetrating members 30 will be in retracted positions. When it is desired to increase the traction of the tire 12, as in the case of snow, ice or mud conditions, it is merely necessary to depress the pedal 120. Ths results in the operation of the valve 52 which in turn results in the entrance of air into the cylinders 22. When the cylinders are in their operative positions, the pistons 26 will be projected as to project the roadway penetrating members 30. Once the roadway penetrating members 30 have been projected, the valve arrangement of the valve 52 will prevent the pressure engagement of the roadway surface from returning the roadway penetrating members 30 to their original retracted positions. On the other hand, when the valve 52 is in the position illustrated in Figure 3, the pressure of the roadway will accomplish this so as to automatically retract the roadway penetrating members 30 when desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said pistons and seated in one of said bores for projection therefrom, an air line connecting together said cylinders, and a valve disposed between said air line and the interior of said tire, said valve including operator-operated means for selectively communicating said air line with pressure within said tire for actuating said traction assembly.

2. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said pistons and seated in one of said bores for projection therefrom, an air line connecting together said cylinders, a valve disposed between said air line and the interior of said tire, said valve including operator-operated means for selectively communicating said air line with pressure within said tire for actuating said traction assembly, and operator-operated means for controlling operation of said valve from a remote point while said tire is revolving.

3. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said pistons and seated in one of said bores for projection therefrom, an air line connecting together said cylinders, a valve disposed between said air line and the interior of said tire for selectively communicating said air line with said tire interior, means for controlling operation of said valve from a remote point while said tire is revolving, said means including a ring member resiliently carried by said tire and projecting inwardly from a side wall of said tire, said ring member being engaged with said valve, fixed rollers aligned with said ring member for engaging and depressing said ring member to operate said valve, and control means for positioning said ring member.

4. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said pistons and seated in one of said bores for projection therefrom, an air line connecting together said cylinders, a valve disposed between said air line and the interior of said tire for selectively communicating said air line with said tire interior, means for controlling operation of said valve from a remote point while said tire is revolving, said means including a ring member resiliently carried by said tire and projecting inwardly from a side wall of said tire, said ring member being engaged with said valve, fixed rollers aligned with said ring member for engaging and depressing said ring member to operate said valve, and control means for positioning said ring member, said control means including a foot pedal operator adapted to be mounted adjacent an operator's seat of a vehicle.

5. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said pistons and seated in one of said bores for projection therefrom, an air line connecting together said cylinders, and a valve disposed between said air line and the interior of said tire for selectively communicating said air line with said tire interior, said valve including a valve housing, an exhaust fitting connected to and communicated with the interior of said valve housing, an inlet fitting, said exhaust fitting and said inlet fittings being connected to said air line, a valve member slidably mounted in valve housing, said valve member including a first portion engaging said valve housing for closing said exhaust fitting, and a second portion normally engaging said inlet fitting and closing the same.

6. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said pistons and seated in one of said bores for projection therefrom, an air line connecting together said cylinders, and a valve disposed between said air line and the interior of said tire for selectively communicating said air line with said tire interior, said valve including a valve housing, an exhaust fitting connected to and communicated with the interior of said valve housing, an inlet fitting, said exhaust fitting and said inlet fittings being connected to said air line, a valve member slidably mounted in valve housing, said valve member including a first portion engaging said valve housing for closing said exhaust fitting, and a second portion normally engaging said inlet fitting and closing the same, said inlet fitting having an inlet only check valve, said exhaust fitting having an exhaust only check valve.

7. In combination with a vehicle tire having a tread portion, a traction increasing assembly, said traction increasing assembly comprising a plurality of cylinders, said cylinders being imbedded in said tire and being disposed in circumferentially spaced relation, bores in said tire opening through said tread portion, said bores being aligned with said cylinders, a piston in each of said cylinders, a roadway penetrating member carried by each of said piston and seated in one of said bores for projection therefrom, an air line connecting together said cylinders, a valve disposed between said air line and the interior of said tire for selectively communicating said air line with said tire interior, said valve including a valve housing, an exhaust fitting connected to and communicated with the interior of said valve housing, an inlet fitting, said exhaust fitting and said inlet fittings being connected to said air line, a valve member slidably mounted in valve housing, said valve member including a first portion engaging said valve housing for closing said exhaust fitting, and a second portion normally engaging said inlet fitting and closing the same, and means for controlling operation of said valve from a remote point while said tire is revolving.

8. In combination with a pressurized vehicle tire including a tread portion, a traction increasing assembly including a plurality of circumferentially spaced cylinders imbedded in said tread portion, bores in said tread portion opening through said tread portion and in alignment with said cylinders, a piston in said cylinders including a normally retracted road penetrating member extensible out of said bores beyond the outer surface of said tread portion, an air line communicating with said cylinders, and an operator-operated valve disposed between said air line and the interior of said tire for selectively communicating said air line with the pressure within said tire to said cylinders for extending said road penetrating members beyond the outer surface of said tread portion.

References Cited in the file of this patent
UNITED STATES PATENTS

| | | |
|---|---|---|
| 1,858,094 | Iruz | May 10, 1932 |
| 2,480,548 | Carhart | Aug. 30, 1949 |
| 2,672,908 | Donegan | Mar. 23, 1954 |